Figure 1:
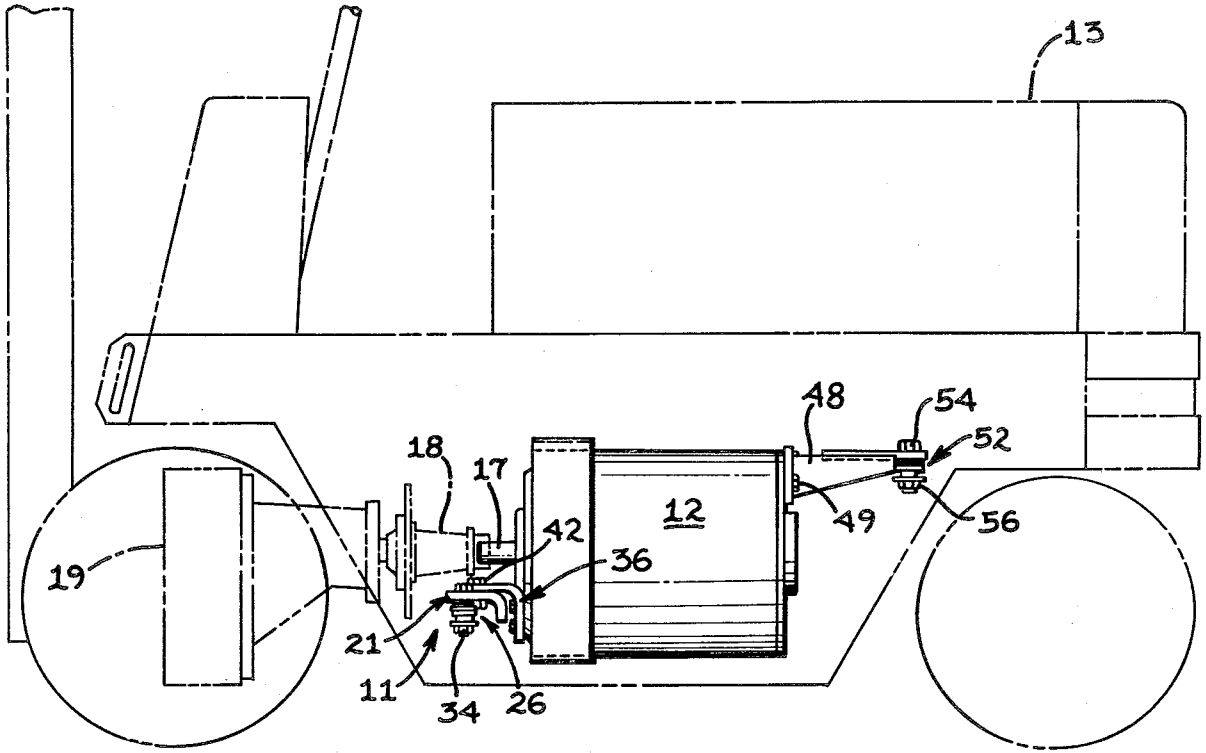
Figure 2:
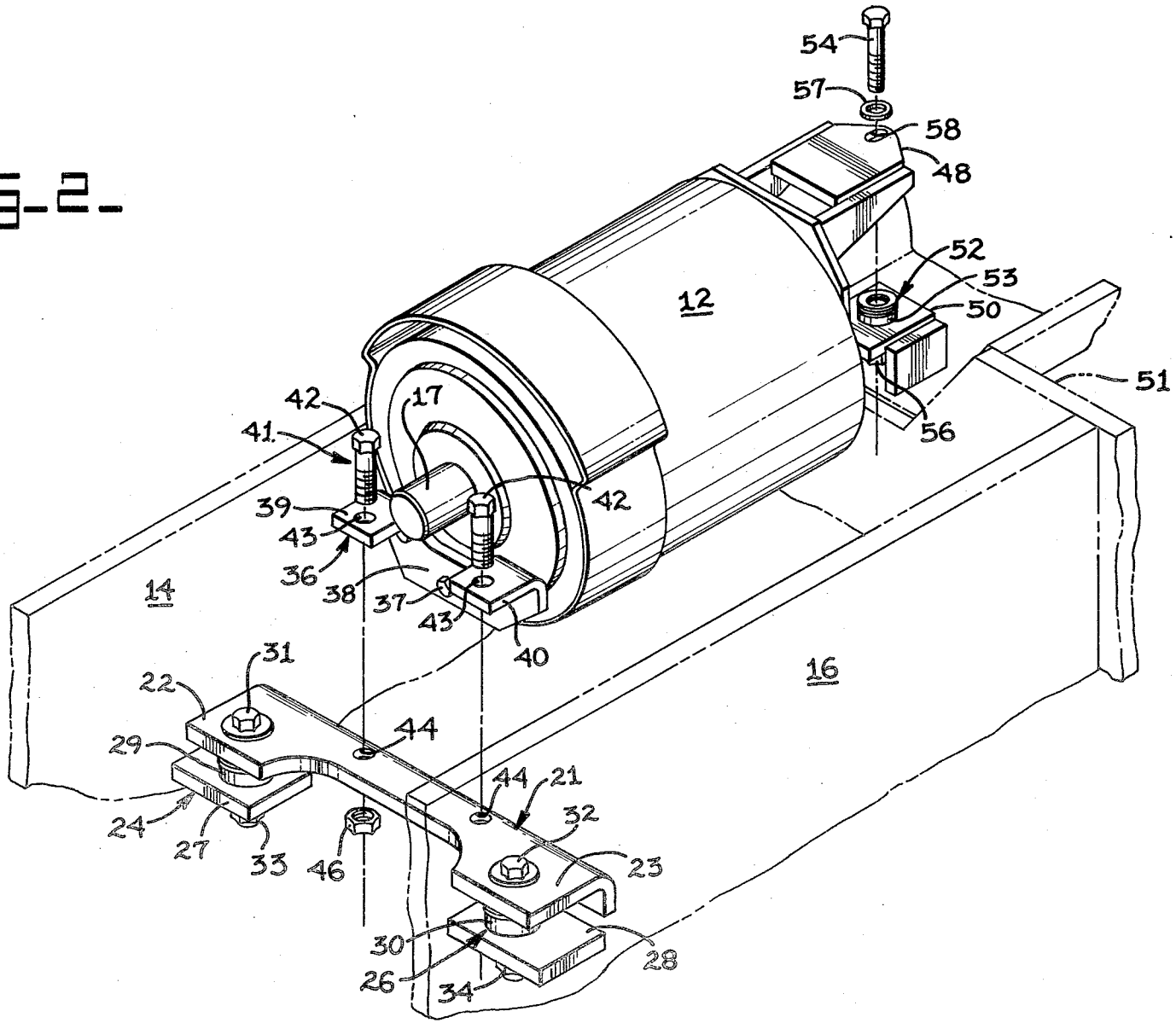

United States Defensive Publication [19] (H) [11] T998,004

Higgins [43] Sep. 2, 1980

[54] VEHICLE MOTOR MOUNTING FACILITATING MOTOR INSTALLATION

[75] Inventor: Robert D. Higgins, Highland Heights, Ohio

[73] Assignee: Towmotor Corporation, Mentor, Ohio

[21] Appl. No.: 904,087

[22] Filed: May 8, 1978

[51] Int. Cl.[2] ..... B60K 5/02

[52] U.S. Cl. ..... 180/299

[57] ABSTRACT

A motor mounting assembly is separable into two portions between the frame and the motor enabling one portion of the mounting assembly to remain resiliently connected to the vehicle frame while the other portion is removed with the motor. Reinstallation of the motor is greatly simplified as the separable portions of the mounting assembly can readily be repositioned and reconnected without the misalignment problems encountered during installation of motors using conventional mounts which must be engaged at the vehicle frame.

3 Claims, 2 Sheets Drawing,

9 Pages Specification

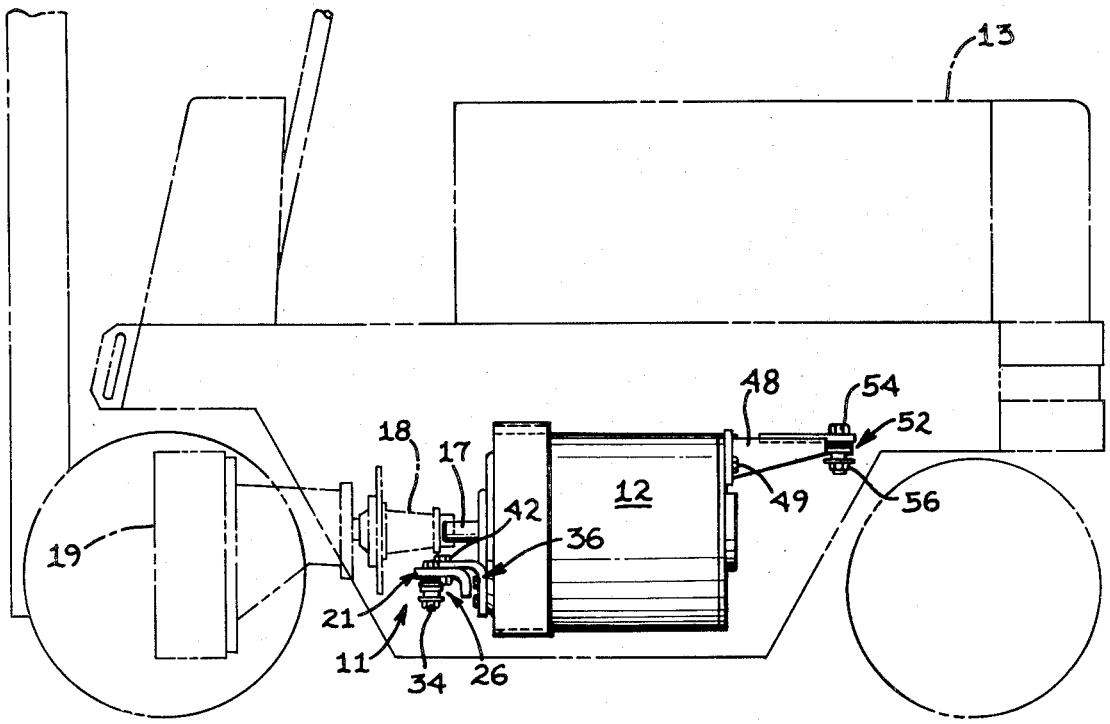

The file of this unexamined application may be inspected and copies thereof may be purchased (849 O.G. 1221, Apr. 9, 1968).